(12) United States Patent
Klement et al.

(10) Patent No.: US 11,580,922 B2
(45) Date of Patent: Feb. 14, 2023

(54) DISPLAY LATENCY REDUCTION

(71) Applicant: Meta Platforms Technologies, LLC, Menlo Park, CA (US)

(72) Inventors: Alexander Klement, Kenmore, WA (US); Cheonhong Kim, Mountain View, CA (US); Wonjae Choi, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 29 days.

(21) Appl. No.: 17/134,106

(22) Filed: Dec. 24, 2020

(65) Prior Publication Data
US 2022/0208134 A1 Jun. 30, 2022

(51) Int. Cl.
*G09G 3/36* (2006.01)
*G09G 5/10* (2006.01)
*G02B 27/01* (2006.01)

(52) U.S. Cl.
CPC .............. *G09G 3/3607* (2013.01); *G09G 5/10* (2013.01); *G02B 27/0172* (2013.01); *G02B 2027/014* (2013.01); *G02B 2027/0178* (2013.01); *G09G 2310/08* (2013.01); *G09G 2320/0646* (2013.01)

(58) Field of Classification Search
None
See application file for complete search history.

(56) References Cited

U.S. PATENT DOCUMENTS

| | | | |
|---|---|---|---|
| 10,311,808 B1 | 6/2019 | Richards et al. | |
| 10,540,930 B1 | 1/2020 | Kim et al. | |
| 10,553,164 B1 | 2/2020 | Richards et al. | |
| 2006/0250346 A1* | 11/2006 | Ham | G09G 3/3648 345/101 |
| 2008/0001911 A1 | 1/2008 | Kim | |
| 2011/0279490 A1* | 11/2011 | Lee | G09G 3/003 345/691 |
| 2017/0287409 A1* | 10/2017 | Richards | G09G 3/3406 |
| 2019/0043438 A1* | 2/2019 | Yanagi | G09G 3/3688 |

FOREIGN PATENT DOCUMENTS

WO 2013079253 A1 6/2013

OTHER PUBLICATIONS

International Search Report and Written Opinion for International Application No. PCT/US2021/062971, dated Apr. 7, 2022, 7 pages.

* cited by examiner

*Primary Examiner* — Andre L Matthews
(74) *Attorney, Agent, or Firm* — Fenwick & West LLP

(57) ABSTRACT

A display device dynamically determines pixel settle times to reduce a display latency. The display device includes a backlight unit (BLU) for providing light for displaying an image, a plurality of pixels for modulating the light provided by the BLU, and a controller circuit for controlling the BLU and the plurality of pixels. The controller circuit determines a settle time from display data for a current display frame and display data for a previous display frame, and turns on the BLU based on the determined settle time. The determined settle time corresponding to an expected amount of time for the plurality of pixel to transition from a first state corresponding to the display data for the previous display frame to a second state corresponding to the display data for the current display frame.

20 Claims, 11 Drawing Sheets

DISPLAY LATENCY REDUCTION

FIELD OF THE INVENTION

This disclosure relates generally to display devices, and more specifically to dynamically adapting a display latency of a display device.

BACKGROUND

Digital systems suffer from latency issues, where an output is slightly delayed from an input that triggers the output. For example, the image displayed by a display devices (such as televisions, monitors, and head-mounted displays) is slightly delayed from an input signal provided to the display device. In some applications (e.g., gaming or virtual reality), it is desirable to minimize such display latency. For example, in a virtual reality application, a large display latency may increase an amount of motion sickness experienced by the user of a head-mounted display. Additionally, in a gaming application, a large display latency may reduce the immersion of the player and may reduce a player's ability to accurately control an object (such as a character) in the game.

SUMMARY

Embodiments relate to a display device that dynamically adapts a display latency based on a worst case delay expected for a current display frame, as opposed to having a static display latency that is based on a worst case delay for the display device calculated for any possible set of inputs that can be sent to the display device.

In one or more embodiments, a display device dynamically determines pixel settle times to reduce a display latency. The display device includes a backlight unit (BLU) for providing light for displaying an image, a plurality of pixels for modulating the light provided by the BLU, and a controller circuit for controlling the BLU and the plurality of pixels. The controller circuit determines a settle time from display data for a current display frame and display data for a previous display frame, and turns on the BLU based on the determined settle time. The determined settle time corresponding to an expected amount of time for the plurality of pixel to transition from a first state corresponding to the display data for the previous display frame to a second state corresponding to the display data for the current display frame.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Figure 1A:
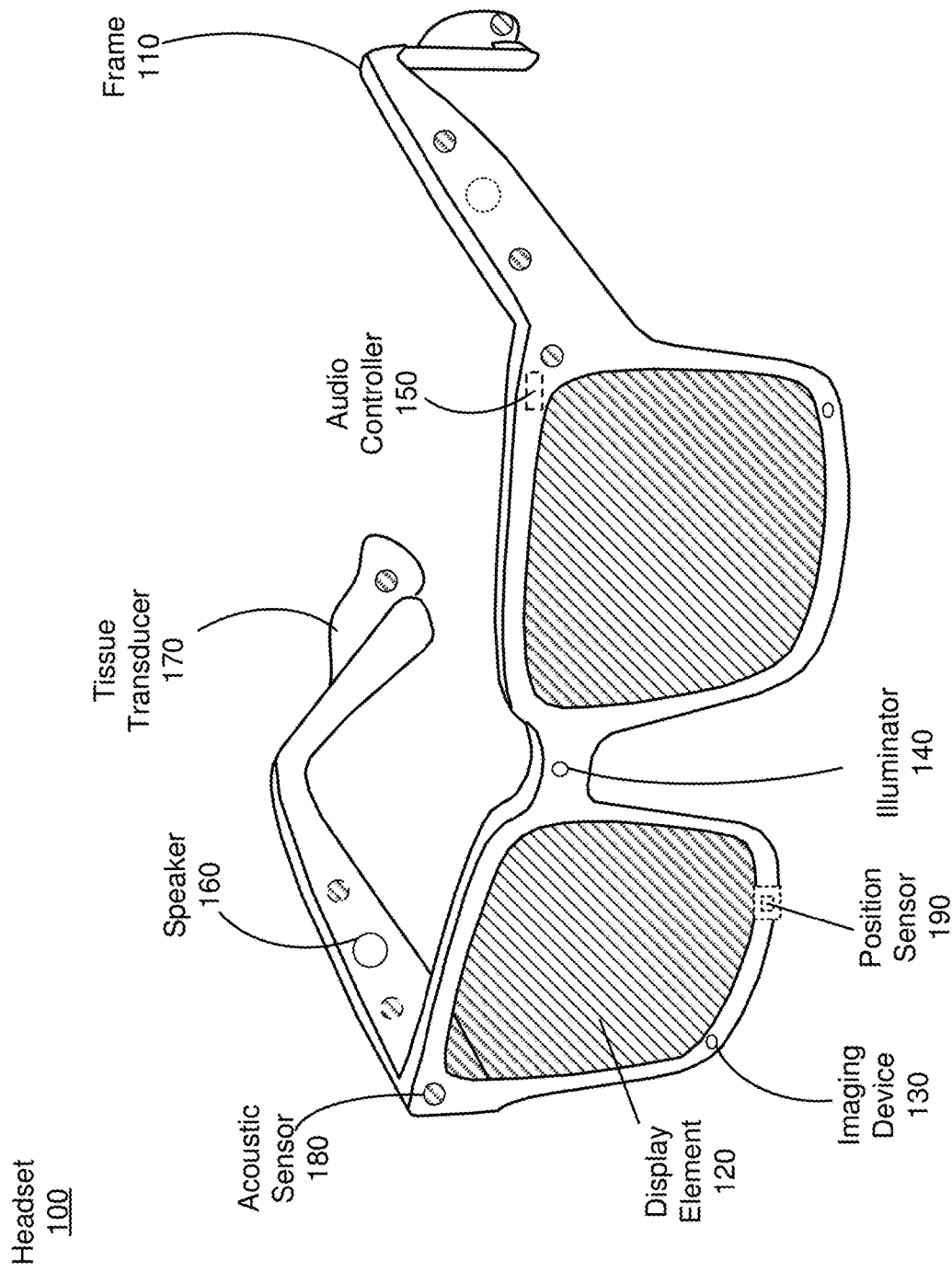
FIG. 1A is a perspective view of a headset implemented as an eyewear device, in accordance with one or more embodiments.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 7.

Figure 1B:
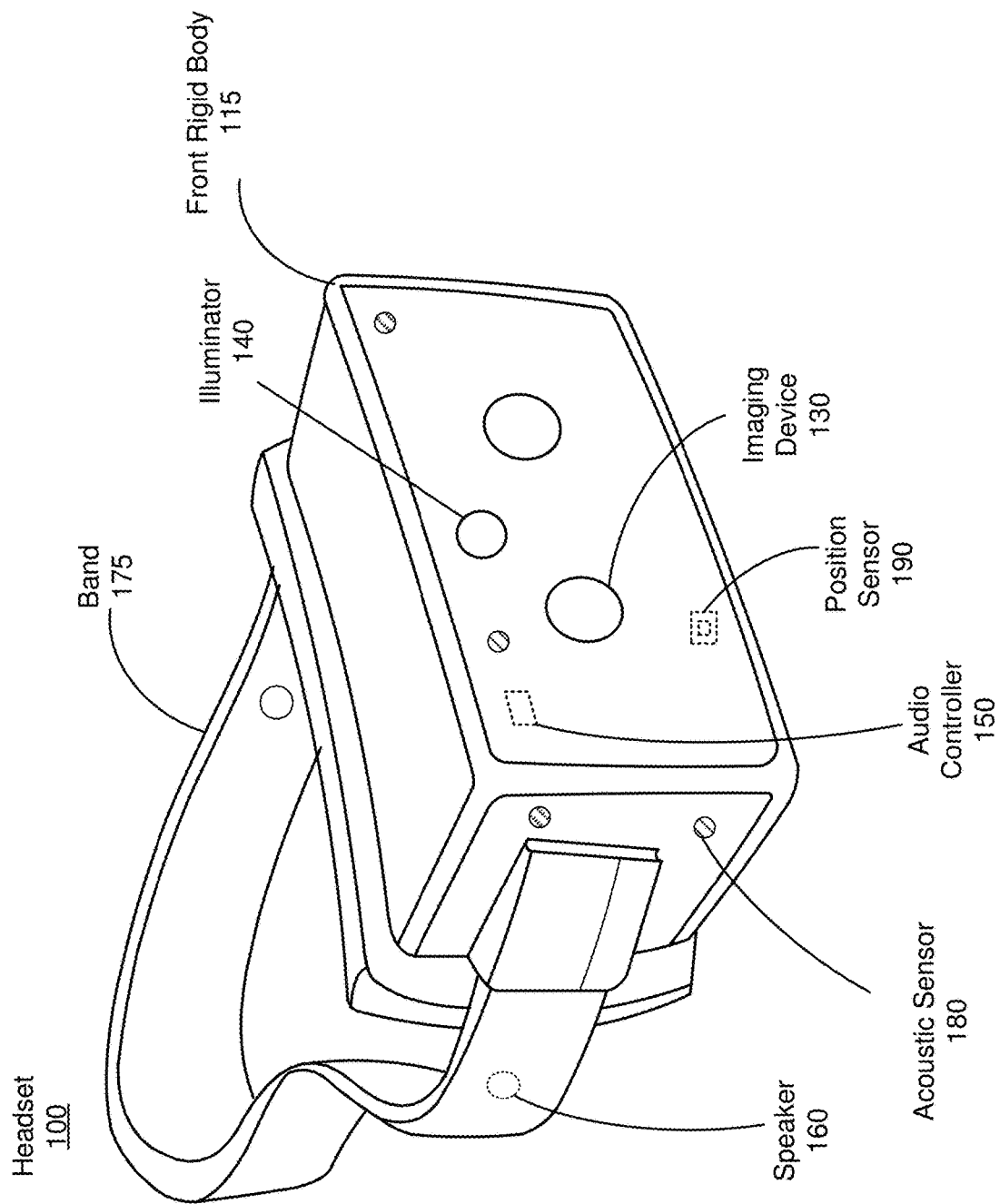
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 1C:
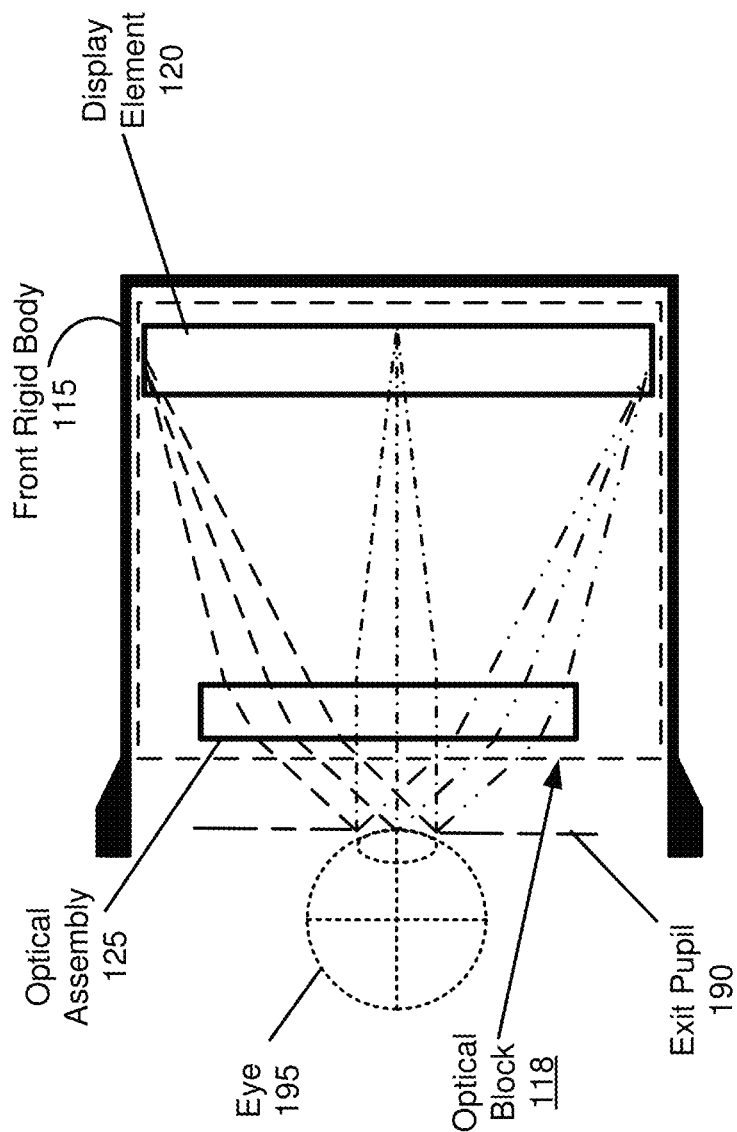
FIG. 1C is a cross section of the front rigid body of the head-mounted display shown in FIG. 1B.

FIG. 1C is a cross section of the front rigid body 115 of the head-mounted display shown in FIG. 1B. As shown in FIG. 1C, the front rigid body 115 includes an optical block 118 that provides altered image light to an exit pupil 190. The exit pupil 190 is the location of the front rigid body 115 where a user's eye 195 is positioned. For purposes of illustration, FIG. 1C shows a cross section associated with a single eye 195, but another optical block, separate from the optical block 118, provides altered image light to another eye of the user.

The optical block 118 includes a display element 120, and the optics block 125. The display element 120 emits image light toward the optics block 125. The optics block 125 magnifies the image light, and in some embodiments, also corrects for one or more additional optical errors (e.g., distortion, astigmatism, etc.). The optics block 125 directs the image light to the exit pupil 190 for presentation to the user.

System Architecture

Figure 2A:
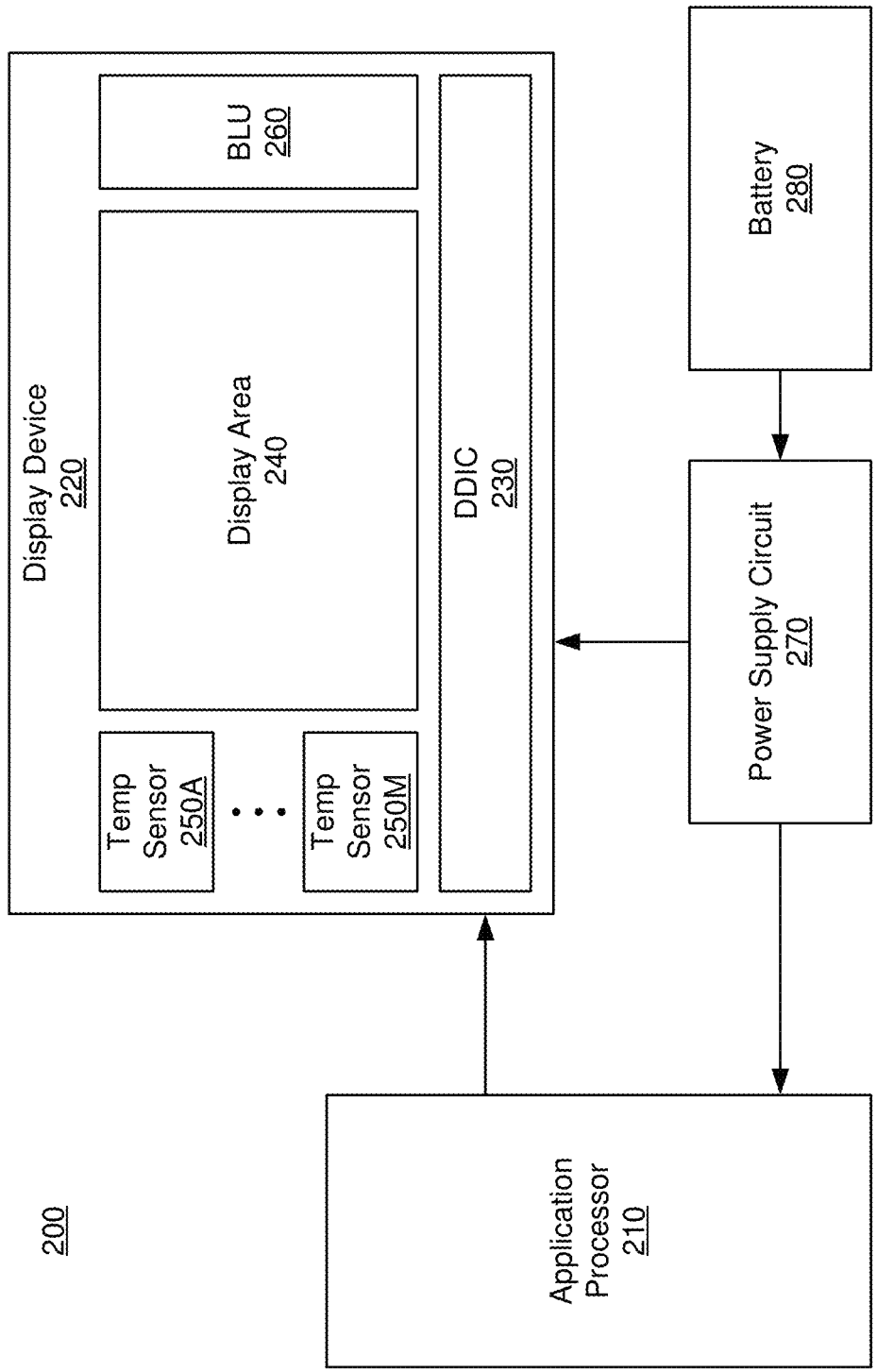
FIG. 2A illustrates a block diagram of an electronic display environment 200, in accordance with one or more embodiments.

FIG. 2A illustrates a block diagram of an electronic display environment 200, in accordance with one or more embodiments. The electronic display environment 200 includes an application processor 210 and a display device 220. In some embodiments, the electronic display environment 200 additionally includes a power supply circuit 270 for providing electrical power to the application processor 210 and the display device 220. In some embodiments, the power supply circuit 270 receives electrical power from a battery 280. In other embodiments, the power supply circuit 270 receives power from an electrical outlet.

The application processor 210 generates display data for controlling the display device to display a desired image. The display data include multiple pixel data, each for controlling one pixel of the display device to emit light with a corresponding intensity. In some embodiments, each pixel data includes sub-pixel data corresponding to different colors (e.g., red, green, and blue). Moreover, in some embodiments, the application processor 210 generates display data for multiple display frames to display a video.

The display device 220 includes a display driver integrated circuit (DDIC) 230, a display area 240, a black light unit (BLU) 260, and one or more temperature sensors 250. The display device 220 may include additional elements, such as one or more additional sensors. The display device 220 may be part of the HMD 100 in FIG. 1A or FIG. 1B. That is, the display device 220 may be an embodiment of the display element 120 in FIG. 1A or FIG. 1C.

The display area 240 includes a set of pixels 245 organized in rows and columns. For example, the display area 240 includes N pixels ($P_{11}$ through $P_{1N}$) in the first row, N pixels ($P_{21}$ through $P_{2N}$) in the second row, N pixels ($P_{31}$ through $P_{3N}$) in the third row, and so on. Each pixel 245 is controlled to provide a light output that corresponds to the display signal received from the application processor 210. For instance, in the case of an LCD panel, the display area 240 includes an array of liquid crystal cells with a controllable polarizations state that can be modified to control an amount of light that can pass through the cell.

The DDIC 230 receives a display signal from the application processor 210, and generates control signals for controlling each pixel 245 in the display area 240, and the BLU 260. For example, the DDIC 230 generates signals to program each of the pixels 245 in the display area 240 according to an image signal received from the application processor 210. Moreover, the DDIC 230 generates one or more signals to turn the BLU 260.

The BLU 260 includes light sources that are turned on at predetermined time periods to generate light that can pass through each of the liquid crystal cell to produce a picture for display by the display device. The light sources of the BLU 260 illuminate light towards the array of liquid crystal cells in the display area 240 and the array of liquid crystal cells controls an amount and location of light passing through the display area 240. In some embodiments, the BLU 260 includes multiple segmented backlight units, each segmented backlight unit providing light sources for a specific region or zone of the display area 240.

The temperature sensors 250 determine a temperature at one or more regions of the display area 240. In some embodiments, the temperature sensors 250 are electronic circuits that estimate a temperature based on a current or voltage across an electronic component (e.g., a diode or a resistor).

Figure 2B:
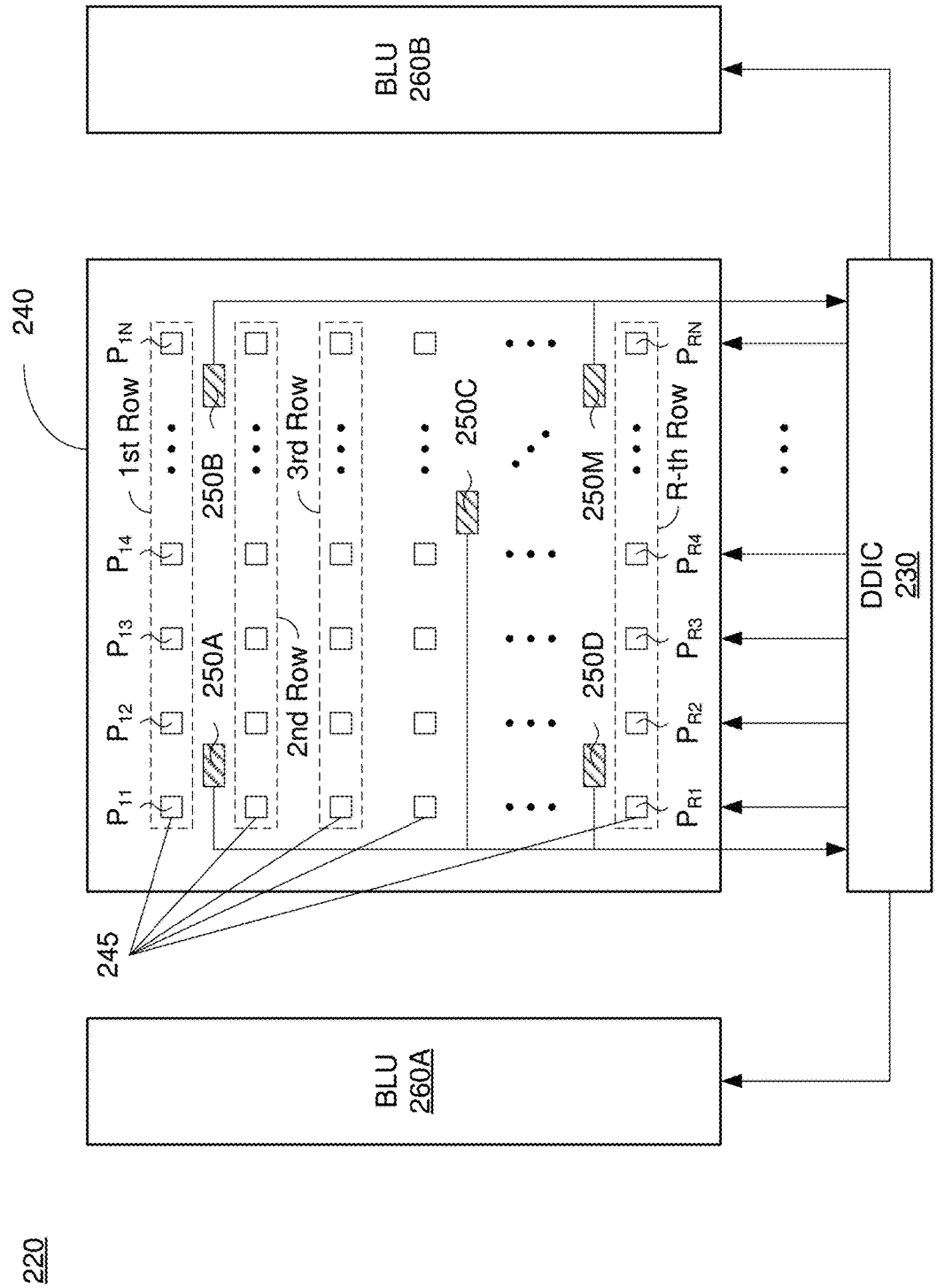
FIG. 2B illustrates an example display device with a two-dimensional array of illumination elements or LC-based pixels, in accordance with one or more embodiments.

FIG. 2B illustrates an example display device 220 with a two-dimensional array of illumination elements or LC-based pixels 245, in accordance with one or more embodiments. In one embodiment, the display device 220 may display a plurality of frames of video content based on a global illumination where all the pixels 245 simultaneously illuminate image light for each frame. In an alternate embodiment, the display device 220 may display video content based on a segmented illumination where all pixels 245 in each segment of the display device 220 simultaneously illuminate image light for each frame of the video content. For example, each segment of the display device 220 may include at least one row of pixels 245 in the display device 220, as shown in FIG. 2B. In the illustrative case where each segment of the display device 220 for illumination includes one row of pixels 245, the segmented illumination can be referred to as a rolling illumination. For the rolling illumination, all pixels 245 in a first row of the display device 220 simultaneously illuminate image light in a first time instant; all pixels 245 in a second row of the display device 220 simultaneously illuminate image light in a second time instant consecutive to the first time instant; all pixels 245 in a third row of the display device 220 simultaneously illuminate image light in a third time instant consecutive to the second time instant, and so on. Other orders of illumination of rows and segments of the display device 220 are also supported in the present disclosure. In yet another embodiment, the display device 220 may display video content based on a controllable illumination where all pixels 245 in a portion of the display device 220 of a controllable size (not shown in FIG. 2B) simultaneously illuminate image light for each frame of the video content. The controllable portion of the display device 220 can be rectangular, square or of some other suitable shape. In some embodiments, a size of the controllable portion of the display device 220 can be a dynamic function of a frame number.

The temperature sensors 250 are embedded into the active area 240 of the display device 220. The temperature sensors 250 are arranged in a two-dimensional array or mesh of temperature sensors 250 placed on a top portion of the display device 220 such that the temperature sensors 250 are coupled to the LC-based pixels 245. In some embodiments, the mesh of temperature sensors 250 is configured to measure temperatures associated with all the pixels 245 of the display device 220 for a plurality of time instants, i.e., for each frame of video content displayed on the display device 220. In alternate embodiments, the mesh of temperature sensors 250 is configured to measure temperatures of at least a portion of the pixels 245 of the display device 220.

The mesh of temperature sensors 250 need not correspond to the pixels 245 of the display device 220. In some embodiments, there is 1:1 correspondence between temperature sensors 250 and the pixels 245 of the display device 220, where each temperature sensor 250 is coupled to a different pixel 245 of the display device 220 and measures a current temperature associated with that pixel 245. In some other embodiments, there is a fewer temperature sensors 250 than the pixels 245 in the display device 220. For example, each temperature sensor 250 with a fewer temperature sensors than the pixels 245 in the display device 220 can be coupled to one or more pixels 245 in any portion of the display device 220, and can be configured to measure one or more temperatures associated with the one or more pixels 245. Alternatively, the mesh of temperature sensors 250 with a fewer temperature sensors than the pixels 245 in the display device 220 can measure temperatures of a portion of the pixels 245 in the display device 220.

Display Sequence

Figure 3A:
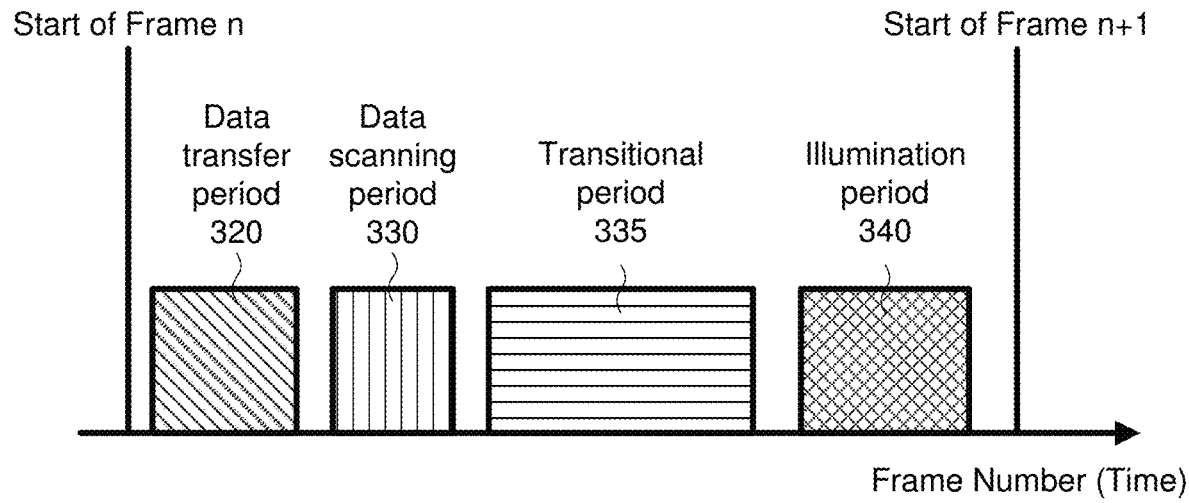
FIG. 3A is a graph illustrating a time duration of each operating phase of the display device in FIG. 2B, in accordance with one or more embodiments.
Figure 3B:
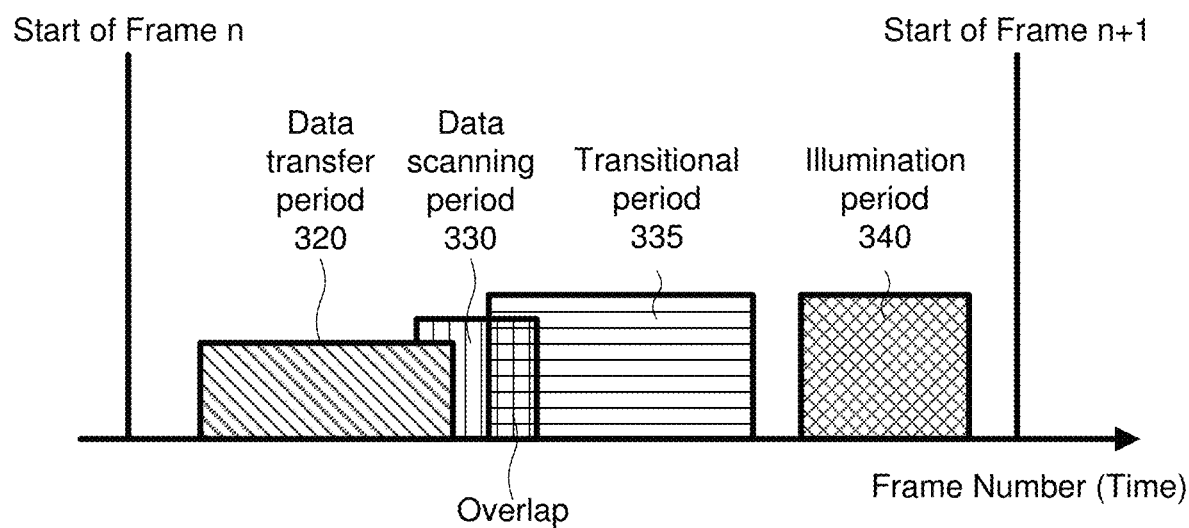
FIG. 3B is a graph illustrating a time duration of each operating phase of the display device in FIG. 2B having overlapping data scanning period and transitional period, in accordance with one or more embodiments.

FIG. 3A is a graph 310A illustrating a time duration of each operating phase of the display device 220 in FIG. 2B, in accordance with one or more embodiments. FIG. 3B is a graph 310B illustrating a time duration of each operating phase of the display device 220 in FIG. 2B having overlapping data scanning period 330 and transitional period 335, in accordance with one or more embodiments. The graphs 310A and 310B illustrate operating phases when an arbitrary frame n of video content is processed for displaying on the display device 220, before a next consecutive frame n+1 is processed.

During a data transfer period 320, display data for a current frame is received. The display data may be received from the application processor 210. The display data includes pixel data for controlling each pixel of the display panel. For instance, the pixel data indicates a desired brightness of each pixel of the display panel. The display data may be received serially. That is, the pixel data for rows of pixels are received one at a time. Pixel data for a first row (e.g., at a top of a display panel) is received before pixel data for a second row (e.g., near the bottom of the display panel). The display data may be received using a predetermined standard and encoding. Moreover, the rate at which the display data is received depends on a speed of the connecting between the display device 220 and the application processor 210.

In some embodiments, the display device 220 includes a memory (e.g., a random-access memory (RAM)) for storing information for used for generating the pixel data for controlling each pixel of the display panel. For example, the information stored in the memory of the display device 220 may be combined with display data received form the application processor to generate the pixel data for controlling each pixel of the display panel. The information stored may include display data of previous frames. The application processor may then use a compression algorithm to generate compressed display data that when combined with the display data of previous frames, the display device is able to generate the uncompressed display data for the current frame. For example, the compressed display data includes information indicating changes between an image displayed in a previous frame and an image to be displayed in a current frame.

In some embodiments, the memory of the display device 220 may be used to store display data for future frames (e.g., display data for a next frame). In this embodiment, the display device 220 may start receiving display data for a next frame right after the data transfer period 320 for the current frame has been completed. As such, the data transfer period 320 for the next frame may be overlapped with the illumination period 340 of the current frame, the transitional period 335 of the current frame, or the data scanning period 330 of the current frame.

During a data scanning period 330, the pixels 245 of the display device 220 are scanned with data associated with the currently processed frame n. That is, the pixels 245 are scanned and loaded with digital values associated with intensities of light to be emitted from the pixels 245 when displaying the current frame n. In some embodiments, during the data scanning period 330, the pixels 245 of the display device 220 are scanned based on progressive scanning where rows of the pixels 245 are scanned in sequential order, e.g., starting with the top or first row of pixels 245, and ending with the bottom or R-th row of pixels 245. In one embodiment, for the global illumination, duration of the data scanning period 330 corresponds to a time required for scanning all the pixels 245 in the display device 220. In another embodiment, for the segmented illumination, a duration of the data scanning period 330 corresponds to a time required for scanning all pixels 245 in a segment of the display device 220. In yet another embodiment, for the controllable illumination, a duration of the data scanning period 330 corresponds to a time required for scanning all pixels 245 in a controllable portion of the display device 220.

As shown in FIG. 3A, in some embodiments, the data scanning period 330 is performed after the data transfer period 320 has been completed. That is, the data scanning period 330 is initiated after the display data has been received. Alternatively, as shown in FIG. 3B, the data scanning period 330 overlaps with the data transfer period 320. That is, after pixel data for pixels in one row of the display panel has been received, the pixel data can be loaded into the pixels of the corresponding row.

The data scanning period 330 is followed by a transitional period 335 during which each pixel 245 in at least a portion of the display device 220 transitions from a first illumination state to a second illumination state. An illumination state of a pixel 245 in the display device 220 can be defined as a digital number that corresponds to an intensity of light emitted from the pixel 245. The first illumination state is represented by a digital number associated with an intensity of light emitted from each pixel 245 when displaying on the display device 220 a previously processed frame n−1. The second illumination state is represented by another digital number associated with another intensity of light emitted from that same pixel 245 when displaying on the display device 220 the currently processed frame n. A time period required for each pixel 245 of the display device 220 to transition from the first (starting) illumination state to the second (ending) illumination state can be referred to as an LC transition time of that pixel 245. The LC transition time is a function of a starting illumination state, an ending illumination state, and a current temperature associated with that pixel 245. The LC transition time is longer for a lower pixel temperature and shorter for a higher pixel temperature when illumination transitions involve the same starting and ending states.

In one embodiment, for the global illumination where all the pixels 245 in the display device 220 simultaneously illuminate image light for the currently processed frame n, a duration of the transitional period 335 in FIG. 3A corresponds to the longest LC transition time of any of the pixels 245 in the display device 220. In another embodiment, for the segmented illumination where all pixels 245 of a segment of the display device 220 simultaneously illuminate image light for the currently processed frame n, a duration of the transitional period 335 in FIG. 3A corresponds to the longest LC transition time of any of the pixels 245 in the segment. In yet another embodiment, for the controllable illumination where all pixels 245 of a portion of the display device 220 with a controllable size simultaneously illuminate image light for the currently processed frame n, a duration of the transitional period 335 corresponds to the longest LC transition time of any of the pixels 245 in the controllable portion of the display device 220.

As shown in FIG. 3A, in some embodiments, the transitional period 335 is performed after the data scanning period 330 has been completed. That is, the pixels are controlled to transition from the first illumination state to the second illumination state after all the pixels have been loaded with digital values associated with intensities of light to be emitted from the pixels when displaying the current frame n. Alternatively, as shown in FIG. 3B, the transitional period 335 overlaps with the data scanning period 330. That is, a row of pixels are controlled to start transitioning from the first illumination state to the second illumination state after the pixels in the row of pixels have been loaded with digital values associated with intensities of light to be emitted from the pixels when displaying the current frame n.

The transitional period 335 is followed by an illumination period 340. The illumination period 340 represents a time period during which pixels 245 in at least a portion of the display device 220 illuminate image light for the frame n. In one embodiment, for the global illumination, all the pixels 245 in the display device 220 simultaneously illuminate image light for the currently processed frame n during the illumination period 340. In the case of global illumination, duration of the illumination period 340 is, e.g., 2 ms. In another embodiment, for the segmented illumination, all pixels 245 in a segment of the display device 220 simultaneously illuminate image light for the currently processed frame n during the illumination period 340. For example, the segmented illumination might be a rolling illumination, where different segments of the display device 220 are illuminated in series (e.g., one after the other). In yet another embodiment, for the controllable illumination, all pixels 245 in a portion of the display device 220 with a controllable size simultaneously illuminate image light for the currently processed frame n during the illumination period 340.

Constant Refresh Rate

Figure 4:
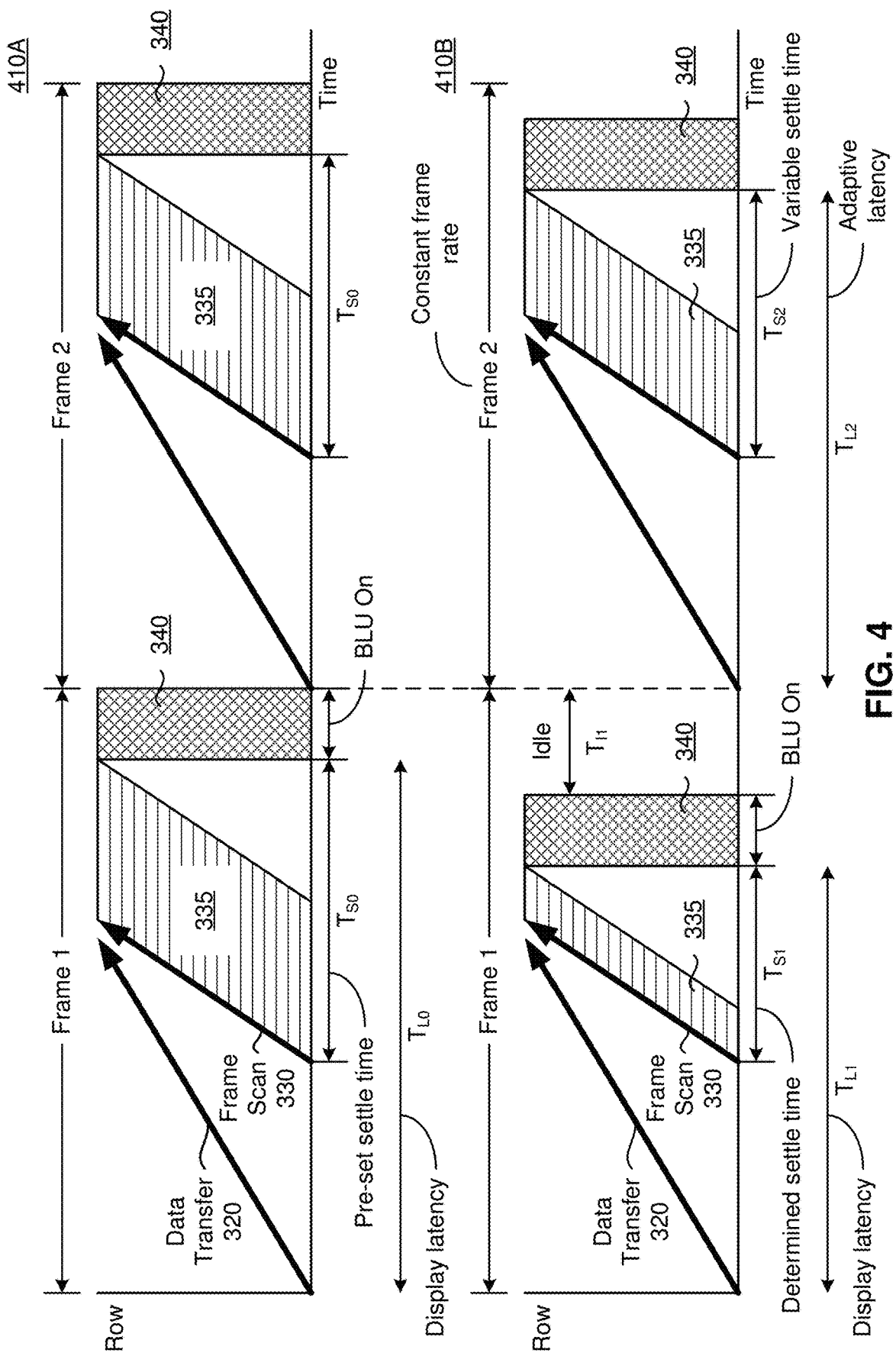
FIG. 4 is a first graph illustrating a display sequence having a pre-set settle time and a second graph illustrating a display sequence having a variable settle time and a constant refresh rate, in accordance with one or more embodiments.

FIG. 4 is a first graph 410A illustrating a display sequence having a pre-set settle time and a second graph 410B illustrating a display sequence having a variable settle time and a constant refresh rate, in accordance with one or more embodiments.

In the display sequence shown in the first graph 410A, the settling time used during the transition period 335 is pre-set and the pre-set setting time accounts for a worst-case scenario. That is, the pre-set settling time is set to a value larger than or equal to the longest possible amount of time a pixel 245 in the display device 220 could take to transition between a first brightness configuration to a second brightness configuration. However, oftentimes, the actual amount of time used by the pixels 245 of a display device 220 is lower than the pre-set amount of time. As such, the pixels 245 of the display device 220 would likely have finished transitioning to the new brightness configuration before the end of the pre-set settle time.

Moreover, since the illumination period 340 does not start until the transitional period 335 has finished, even if the pixels 245 of the display device 220 have finished transitioning to the second brightness configuration, the illumination of the pixels does not start until the pre-set settle time has expired, introducing a set amount of display latency (i.e., the time between when the data transmission for a next frame starts and when the next frame is actually displayed by the display device 220).

To reduce the display latency, the settle time is calculated on a frame-by-frame basis. As such, the illumination period 340 may start as soon as the calculated settle time has expired for a particular frame, expediting the display of the image corresponding to the particular frame.

In particular, during a first frame, the DDIC 230 receives image data from the application processor 210 and determines a settle time $T_{s1}$ based on the received image data. The DDIC then controls the BLU 260 to turn on after the determined settle time $T_{s1}$ has expired. Similarly, during a second frame, the DDIC 230 receives new image data from the application processor 210 and determines a new settle time $T_{s2}$ based on the received new image data. The DDIC then controls the BLU 260 to turn on after the determined new settle time $T_{S2}$ has expired.

For the first frame, the display latency $T_{L1}$ is reduced by $T_{S0}-T_{S1}$, wherein $T_{S0}$ is the pre-set settle time and $T_{S1}$ is the determined settle time for the first frame. Similarly, for the second frame, the display latency $T_{L2}$ is reduced by $T_{S0}-T_{S2}$, wherein $T_{S0}$ is the pre-set settle time and $T_{S2}$ is the determined settle time for the second frame. When operating under a constant refresh rate, even if the illumination period 340 finishes early, the next frame is not started until the pre-set frame period has expired.

In some embodiments, the length of the illumination period 340 is kept constant. That is, even if the illumination period 340 starts earlier, the BLU 260 is turned on for a pre-set amount of time and is turned off after the pre-set amount of time has lapsed. After the BLU 260 is turned off, the display device 220 stays idle until the next frame starts.

In other embodiments, the intensity of the BLU 260 and the amount of time the BLU 260 is turned on for is changed based on the determined settle time. For example, the DDIC may calculate an amount of time between the end of the transitional period 335 and the start of the next frame, and determines a BLU intensity based on the calculated amount of time to achieve a desired average brightness for the frame.

Variable Refresh Rate

Figure 5:
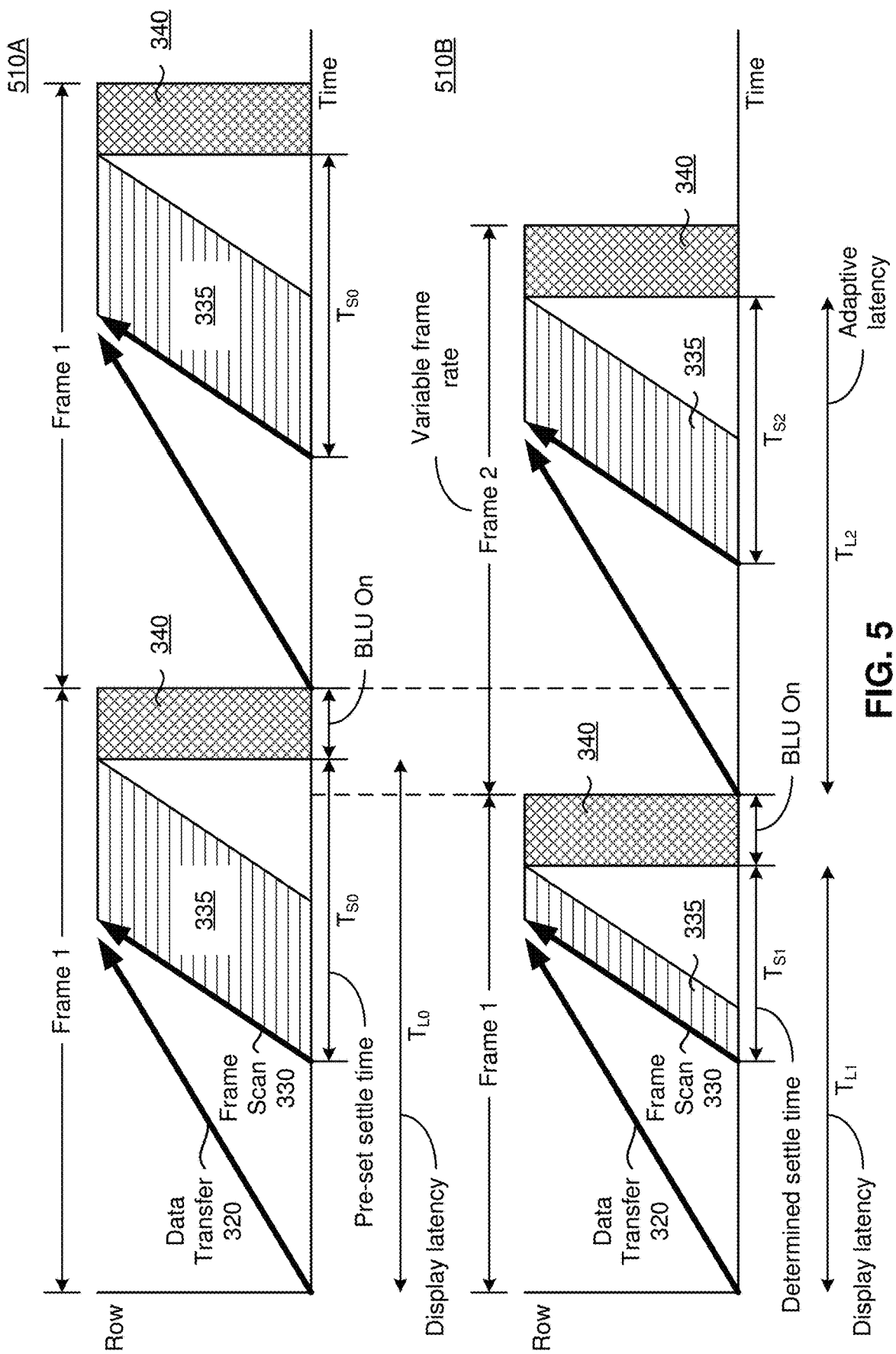
FIG. 5 is a first graph illustrating a display sequence having a pre-set settle time and a second graph illustrating a display sequence having a variable settle time and a variable refresh rate (VRR), in accordance with one or more embodiments.

FIG. 5 is a first graph 510A illustrating a display sequence having a pre-set settle time and a second graph 510B illustrating a display sequence having a variable settle time and a variable refresh rate (VRR), in accordance with one or more embodiments.

In the display sequence shown in the second graph 410B, when the refresh rate of the display device 220 is allowed to change (i.e., not held constant), the start of a second frame may start any time after the illumination period 340 of a previous frame (i.e., first frame) has ended. As such, compared to the display sequence shown in FIG. 4, the VRR display sequence is able to shorten the time the display device stays idle after an illumination period finishes, and further reduces a gap between two consecutive illumination periods.

In particular, in the display sequence 410B of FIG. 4, the gap between the illumination period of the first frame and the illumination period of the second frame is equal to $T_{I1}+T_{L2}$, where $T_{I1}$ is the amount of time the display device 220 stays idle after the end of the illumination period of the first frame, and $T_{L2}$ is the display latency for the second frame. In contrast, in the display sequence 510B of FIG. 5 the gap between the illumination period of the first frame and the illumination period of the second frame is equal to $T_{L2}$. As such, the display sequence 510B of FIG. 5 reduces the gap between illumination period of the first frame and the illumination period of the second frame by $T_{I1}$ compared to the display sequence 410B of FIG. 4.

In some embodiments, to enable a variable refresh rate, the display device 220 communicates with the application processor 210. The display device 220 may synchronize with the application processor 210 such that the application processor 210 is able to transmit an image corresponding to a next frame to the display at a variable rate that is consistent with the variable refresh rate of the display device 220. For instance, the display device 220 may transmit a signal to the application processor 210 when the display device 220 is ready to receive display data corresponding to a next frame. That is, the display device 220 may transmit a signal to the application processor 210 at the end of the transitional period 335 or at the end of the illumination period 340. Conversely, the display device 220 may transmit a signal to the application processor 210 indicative of a time when the display device 220 will be ready to receive display data corresponding to the next frame. That is, after calculating the settle time $T_s$ for the current frame based on the display data received from the application processor 210 for the current frame, the display device 220 sends a signal to the application processor 210 indicating a delay amount before the application processor 210 can start sending display data for the next frame.

Adaptive Latency Process

Figure 6A:
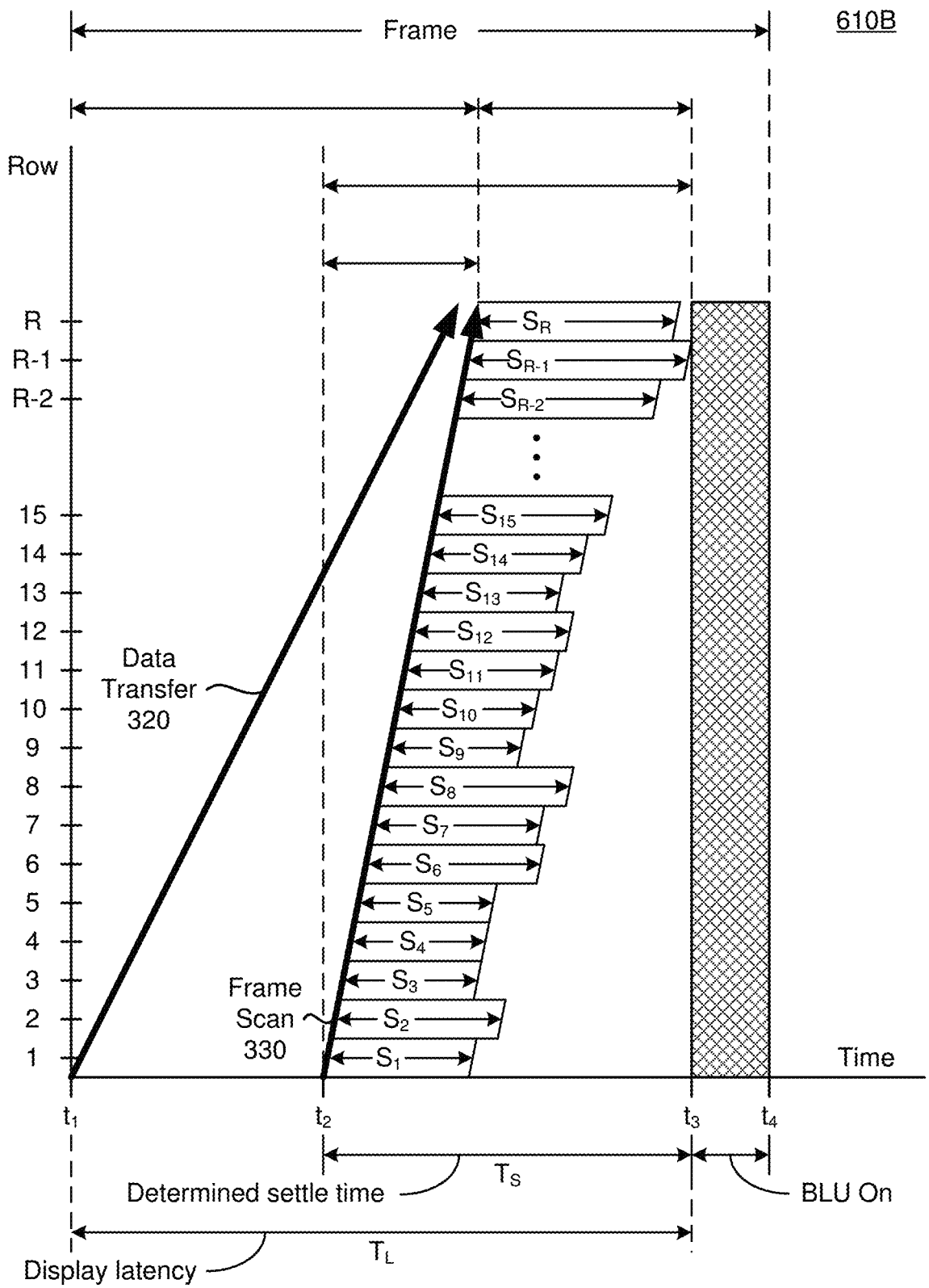
FIG. 6A illustrates a timing diagram illustrating the adaptive latency display sequence, in accordance with one or more embodiments.
Figure 6B:
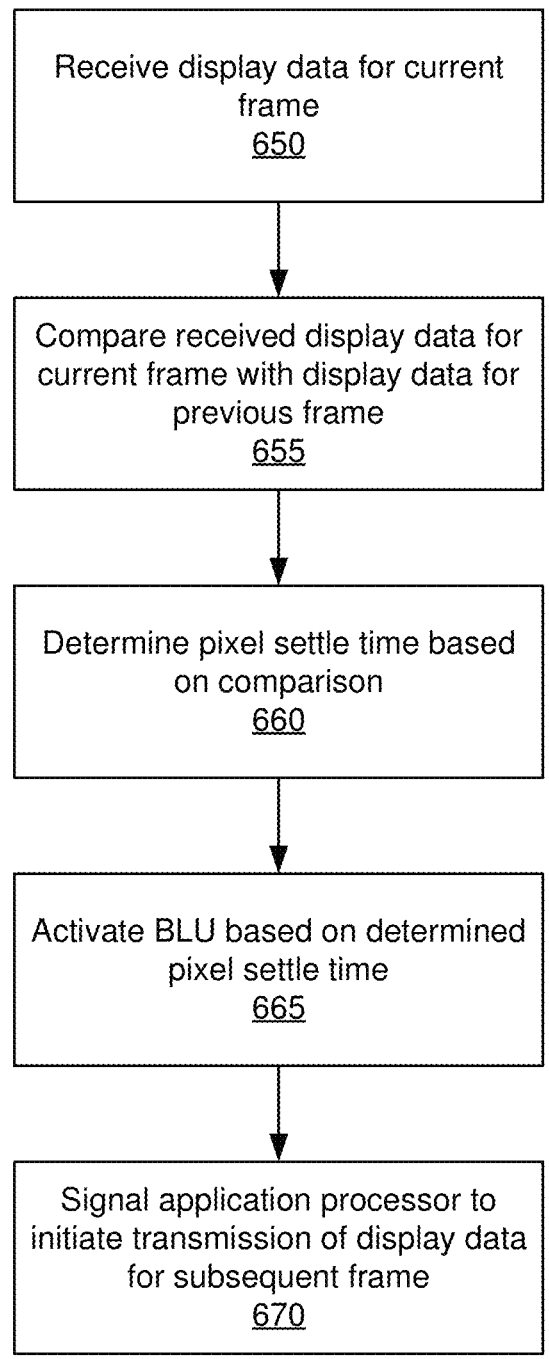
FIG. 6B illustrates a flowchart of a process for dynamically adapting the display latency of a display device, in accordance with one or more embodiments.

FIG. 6A illustrates a timing diagram illustrating the adaptive latency display sequence, in accordance with one or more embodiments. FIG. 6B illustrates a flowchart of a process for dynamically adapting the display latency of a display device, in accordance with one or more embodiments.

At time $t_1$, the application processor 210 starts sending display data for a current frame to the display device 220. The display device 220 starts receiving 650 the display data and stores the received display data in a memory (e.g., a first in first out (FIFO) memory)). In some embodiments, the transfer rate for the display data is set by a display standard (e.g., the high-definition multimedia interface (HDMI) standard). In other embodiments, the transfer rate for the display data is limited by the speed of the link between the application processor 210 and the display device 220.

In some embodiments, the display data is received on a row-by-row (or line-by-line) basis. That is, the display data is split into rows, each corresponding to a row of pixels of the display device. The application processor sends the display data for each pixel in a first row, followed by the display data for each pixel at a second row. Moreover, the application process or may send additional data between the display data of consecutive rows (e.g., in a horizontal blanking interval (HBI or HBlank)). Moreover, the display data may be sent in a predetermined order (e.g., from top to bottom).

As such, the display device 220 may be able to start processing the display data for the current frame before the entire display data for the entire image to be displayed in the current frame is received. That is, after the display device 220 may be able to process the display data for the first row (e.g., top row) of the image to be displayed in the current frame after the display data for the first row has been received from the application processor 210 and before the display data of other rows are received.

For example, after display data for one or more rows are received, the display device 220 may start the data scanning period 330 to load and program each of the pixels in the one or more rows. Moreover, after the display data has been loaded into pixels, the display device may start the transitional period 335 to allow the pixels to transition to a new state to allow the pixel display light at an intensity corresponding to the loaded display data.

The DDIC 230 of the display device 220 compares 655 the display data for the current frame with display data for a previous frame. In some embodiments, the DDIC 230 of the display device 220 compares the values in each row in the display data for the current frame with the values in a corresponding row in the display data for the previous frame.

For example, for each pixel in a row, the DDIC 230 determines a difference D between the pixel value in the display data for the current frame with a pixel value of a corresponding pixel of a corresponding row in the display data for the previous frame:

$$D(i,j) = P_n(i,j) - P_{n-1}(i,j) \quad (1)$$

where $D(i,j)$ is the determined difference for the pixel in the i-th row and j-th column of the display device, $P_n(i,j)$ is the pixel value for the pixel in the i-th row and j-th column of the display device for the current frame, and $P_{n-1}(i,j)$ is the pixel value for the pixel in the i-th row and j-th column of the display device for the previous frame.

The DDIC 230 of the display device 220 determines 660 a pixel settle time $T_S$ based on the comparison. In some embodiments, the DDIC 230 determines a pixel settle time S for each pixel of the display device. In some embodiments, the pixel settle time $S(i,j)$ for the pixel in the i-th row and j-th column is determined based on the determined difference $D(i,j)$. In other embodiments, the pixel settle time $S(i,j)$ for the pixel in the i-th row and j-th column is determined based on the determined difference $D(i,j)$ and the pixel value $P_{n-1}(i,j)$ during the previous frame:

$$S(i,j) = f(P_{n-1}(i,j), D(i,j)) \quad (2)$$

where $f$ is a preset function for determining the pixel settle time. In yet other embodiments, the pixel settle time $S(i,j)$ for the pixel in the i-th row and j-th column is determined based on the pixel value $P_{n-1}(i,j)$ during the previous frame and the pixel value $P_n(i,j)$ during the current frame:

$$S(i,j) = f(P_{n-1}(i,j), P_n(i,j)) \quad (3)$$

In some embodiments, the DDIC 230 determines the pixel settle time based on a temperature of the pixel or a temperature of a region of the panel that includes the pixels:

$$S(i,j) = f(P_{n-1}(i,j), D(i,j), Temp(i,j)) \quad (4)$$

$$S(i,j) = f(P_{n-1}(i,j), P_n(i,j), Temp(i,j)) \quad (5)$$

where $Temp(i,j)$ is the temperature corresponding to the pixel in the i-th row and j-th column. For instance, the temperature $Temp(i,j)$ for the pixel in the i-th row and j-th column is sensed by a temperature sensor 250.

In some embodiments, the function $f$ for determining the pixel settle time is a predetermined function that is programmed into the DDIC 230. In other embodiments, the function $f$ for determining the pixel settle time is executed by looking up a value in a look-up table (LUT). In some embodiments, the function $f$ for determining the pixel settle time involves determining an intermediate value based on pixel value $P_{n-1}(i,j)$ during the previous frame, pixel value $P_n(i,j)$ during the current frame, the determined difference $D(i,j)$, and/or the sensed temperature $Temp(i,j)$, and identifying an entry in the LUT based on the determined intermediate value.

Moreover, for each row, a maximum pixel settle time may be determined. The maximum pixel settle time may be determined by comparing the pixel settle times for each pixel in a row and identifying the pixel with the largest pixel settle time:

$$S_i = \max(S(i,1), S(i,2), \ldots S(i,R)) \quad (6)$$

where $S_i$ is the maximum pixel settle time for the i-th row.

In some embodiment, the DDIC additionally determines an overall settle time $T_S$ for the current frame based on the maximum settle times for each row in the current frame. For example, the overall settle time $T_S$ is determined by comparing the maximum pixel settle times for each row in the current frame and identifying the row with the largest maximum pixel settle time:

$$T_S = \max(S_1, S_2, \ldots, S_R) \quad (7)$$

In some embodiments, the overall settle time $T_S$ is additionally based on when the transition period for the row starts. That is, since the display device scans in the horizontal direction, the i-th row starts transitioning before the (i+1)-th row. As such, in some scenarios, even if the pixel settle time for the i-th row is longer than the pixel settle time for the (i+1)-th row, the i-th row may finish transitioning before the (i+1)-th row. For example, the overall settle time $T_S$ may be determined as:

$$T_S = \max(S_1, S_2+h, S_3+2h \ldots, S_i+(i-1)h, \ldots, S_R+(R-1)h) \quad (8)$$

where h is an amount of time between the start of the pixel transition for one row and the pixel transition for a subsequent row. In some embodiments, h is based on a duration of the data scanning period 330.

The DDIC 230 of the display device 220 activates 665 the BLU 260 based on the determined settle time $T_S$. As such, the BLU 260 generates light and the pixels 245 of the display device 220 modulate the light emitted by the BLU 260 to display a desired image.

Additionally, the DDIC 230 of the display device 220 signals 670 the application processor 210 to initiate the transmission of display data for a subsequent display frame. As such, the display device 220 is able to communicate the application processor 210 when the display of the current frame has been completed and when the display device 220 is ready for the next frame, increasing the refresh rate and reducing a latency of the display device 220.

System Environment

Figure 7:
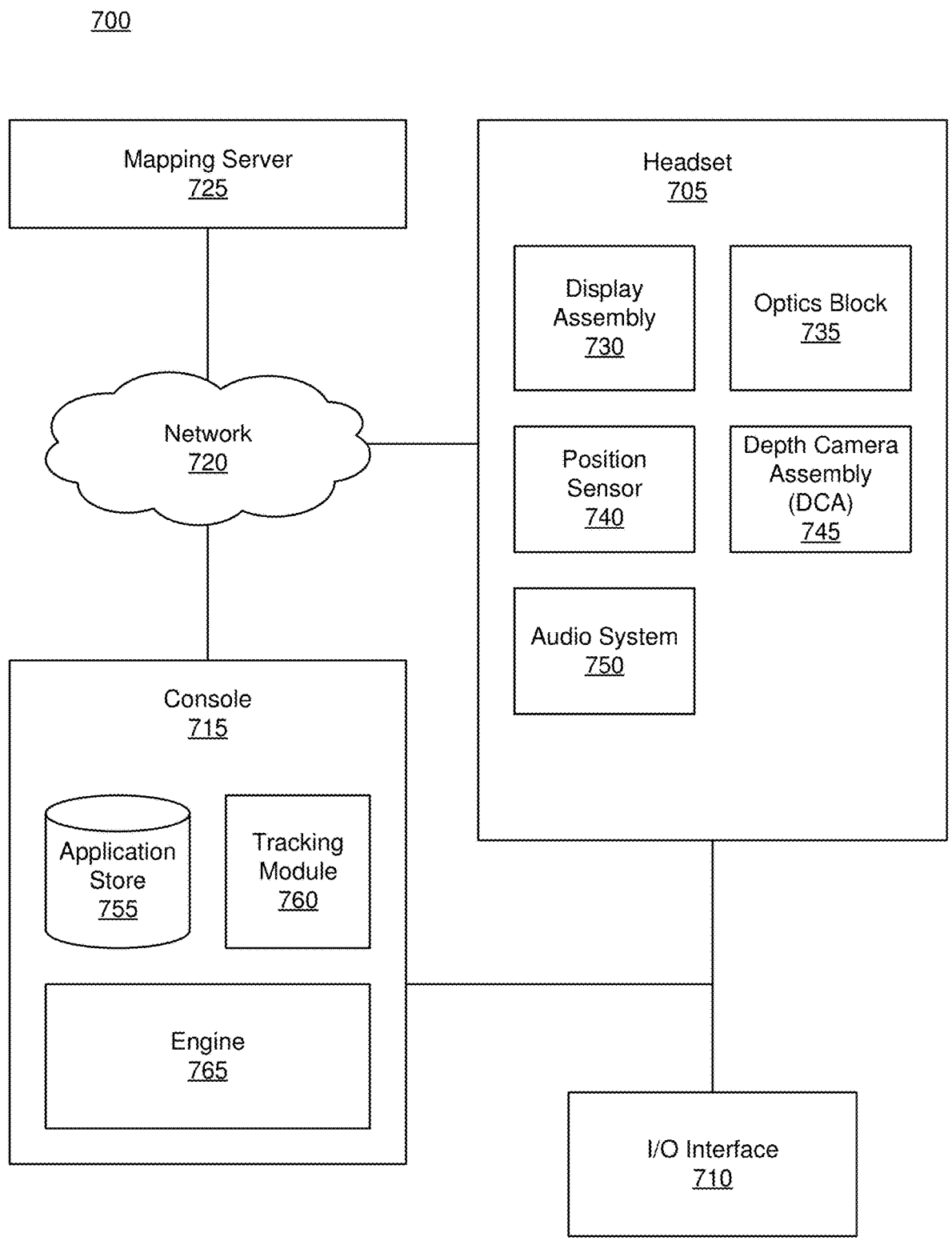
FIG. 7 is a system that includes a headset, in accordance with one or more embodiments.

FIG. 7 is a system 700 that includes a headset 705, in accordance with one or more embodiments. In some embodiments, the headset 705 may be the headset 100 of FIG. 1A or the headset 105 of FIG. 1B. The system 700 may operate in an artificial reality environment (e.g., a virtual reality environment, an augmented reality environment, a mixed reality environment, or some combination thereof). The system 700 shown by FIG. 7 includes the headset 705, an input/output (I/O) interface 710 that is coupled to a console 715, the network 720, and the mapping server 725. While FIG. 7 shows an example system 700 including one headset 705 and one I/O interface 710, in other embodiments any number of these components may be included in the system 700. For example, there may be multiple headsets each having an associated I/O interface 710, with each headset and I/O interface 710 communicating with the console 715. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 715 may be provided by the headset 705.

The headset 705 includes the display assembly 730, an optics block 735, one or more position sensors 740, and the DCA 745. Some embodiments of headset 705 have different components than those described in conjunction with FIG. 7. Additionally, the functionality provided by various components described in conjunction with FIG. 7 may be differently distributed among the components of the headset 705 in other embodiments, or be captured in separate assemblies remote from the headset 705.

The display assembly 730 displays content to the user in accordance with data received from the console 715. The display assembly 730 displays the content using one or more display elements (e.g., the display elements 120). A display element may be, e.g., an electronic display. In various embodiments, the display assembly 730 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 735.

The optics block 735 may magnify image light received from the electronic display, corrects optical errors associated with the image light, and presents the corrected image light to one or both eyeboxes of the headset 705. In various embodiments, the optics block 735 includes one or more optical elements. Example optical elements included in the optics block 735 include: an aperture, a Fresnel lens, a convex lens, a concave lens, a filter, a reflecting surface, or any other suitable optical element that affects image light. Moreover, the optics block 735 may include combinations of different optical elements. In some embodiments, one or more of the optical elements in the optics block 735 may have one or more coatings, such as partially reflective or anti-reflective coatings.

Magnification and focusing of the image light by the optics block 735 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 735 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 735 corrects the distortion when it receives image light from the electronic display generated based on the content.

The position sensor 740 is an electronic device that generates data indicating a position of the headset 705. The position sensor 740 generates one or more measurement signals in response to motion of the headset 705. The position sensor 190 is an embodiment of the position sensor 740. Examples of a position sensor 740 include: one or more IMUs, one or more accelerometers, one or more gyroscopes, one or more magnetometers, another suitable type of sensor that detects motion, or some combination thereof. The position sensor 740 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 705 from the sampled data. For example, the IMU integrates the measurement signals received from the accelerometers over time to estimate a velocity vector and integrates the velocity vector over time to determine an estimated position of a reference point on the headset 705. The reference point is a point that may be used to describe the position of the headset 705. While the reference point may generally be defined as a point in space, however, in practice the reference point is defined as a point within the headset 705.

The DCA 745 generates depth information for a portion of the local area. The DCA includes one or more imaging devices and a DCA controller. The DCA 745 may also include an illuminator. Operation and structure of the DCA 745 is described above with regard to FIG. 1A.

The audio system 750 provides audio content to a user of the headset 705. The audio system 750 is substantially the same as the audio system 200 describe above. The audio system 750 may comprise one or acoustic sensors, one or more transducers, and an audio controller. The audio system 750 may provide spatialized audio content to the user. In some embodiments, the audio system 750 may request acoustic parameters from the mapping server 725 over the network 720. The acoustic parameters describe one or more acoustic properties (e.g., room impulse response, a reverberation time, a reverberation level, etc.) of the local area. The audio system 750 may provide information describing at least a portion of the local area from e.g., the DCA 745 and/or location information for the headset 705 from the position sensor 740. The audio system 750 may generate one or more sound filters using one or more of the acoustic parameters received from the mapping server 725, and use the sound filters to provide audio content to the user.

The I/O interface 710 is a device that allows a user to send action requests and receive responses from the console 715. An action request is a request to perform a particular action. For example, an action request may be an instruction to start or end capture of image or video data, or an instruction to perform a particular action within an application. The I/O interface 710 may include one or more input devices. Example input devices include: a keyboard, a mouse, a game controller, or any other suitable device for receiving action requests and communicating the action requests to the console 715. An action request received by the I/O interface 710 is communicated to the console 715, which performs an action corresponding to the action request. In some embodiments, the I/O interface 710 includes an IMU that captures calibration data indicating an estimated position of the I/O interface 710 relative to an initial position of the I/O interface 710. In some embodiments, the I/O interface 710 may provide haptic feedback to the user in accordance with instructions received from the console 715. For example, haptic feedback is provided when an action request is received, or the console 715 communicates instructions to the I/O interface 710 causing the I/O interface 710 to generate haptic feedback when the console 715 performs an action.

The console 715 provides content to the headset 705 for processing in accordance with information received from one or more of: the DCA 745, the headset 705, and the I/O interface 710. In the example shown in FIG. 7, the console 715 includes an application store 755, a tracking module 760, and an engine 765. Some embodiments of the console 715 have different modules or components than those described in conjunction with FIG. 7. Similarly, the functions further described below may be distributed among components of the console 715 in a different manner than described in conjunction with FIG. 7. In some embodiments, the functionality discussed herein with respect to the console 715 may be implemented in the headset 705, or a remote system.

The application store 755 stores one or more applications for execution by the console 715. An application is a group of instructions, that when executed by a processor, generates content for presentation to the user. Content generated by an application may be in response to inputs received from the user via movement of the headset 705 or the I/O interface 710. Examples of applications include: gaming applications, conferencing applications, video playback applications, or other suitable applications.

The tracking module 760 tracks movements of the headset 705 or of the I/O interface 710 using information from the DCA 745, the one or more position sensors 740, or some combination thereof. For example, the tracking module 760 determines a position of a reference point of the headset 705 in a mapping of a local area based on information from the headset 705. The tracking module 760 may also determine positions of an object or virtual object. Additionally, in some embodiments, the tracking module 760 may use portions of data indicating a position of the headset 705 from the position sensor 740 as well as representations of the local area from the DCA 745 to predict a future location of the headset 705. The tracking module 760 provides the estimated or predicted future position of the headset 705 or the I/O interface 710 to the engine 765.

The engine 765 executes applications and receives position information, acceleration information, velocity information, predicted future positions, or some combination thereof, of the headset 705 from the tracking module 760. Based on the received information, the engine 765 determines content to provide to the headset 705 for presentation to the user. For example, if the received information indicates that the user has looked to the left, the engine 765 generates content for the headset 705 that mirrors the user's movement in a virtual local area or in a local area augmenting the local area with additional content. Additionally, the engine 765 performs an action within an application executing on the console 715 in response to an action request received from the I/O interface 710 and provides feedback to the user that the action was performed. The provided feedback may be visual or audible feedback via the headset 705 or haptic feedback via the I/O interface 710.

The network 720 couples the headset 705 and/or the console 715 to the mapping server 725. The network 720 may include any combination of local area and/or wide area networks using both wireless and/or wired communication systems. For example, the network 720 may include the Internet, as well as mobile telephone networks. In one embodiment, the network 720 uses standard communications technologies and/or protocols. Hence, the network 720 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 720 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 720 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 725 may include a database that stores a virtual model describing a plurality of spaces, wherein one location in the virtual model corresponds to a current configuration of a local area of the headset 705. The mapping server 725 receives, from the headset 705 via the network 720, information describing at least a portion of the local area and/or location information for the local area. The user may adjust privacy settings to allow or prevent the headset 705 from transmitting information to the mapping server 725. The mapping server 725 determines, based on the received information and/or location information, a location in the virtual model that is associated with the local area of the headset 705. The mapping server 725 determines (e.g., retrieves) one or more acoustic parameters associated with the local area, based in part on the determined location in the virtual model and any acoustic parameters associated with the determined location. The mapping server 725 may transmit the location of the local area and any values of acoustic parameters associated with the local area to the headset 705.

One or more components of system 700 may contain a privacy module that stores one or more privacy settings for user data elements. The user data elements describe the user or the headset 705. For example, the user data elements may describe a physical characteristic of the user, an action performed by the user, a location of the user of the headset 705, a location of the headset 705, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 700 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A display device comprising:
a backlight unit (BLU) for providing light for displaying an image;
a plurality of pixels organized in a plurality of rows for modulating the light provided by the BLU; and
a controller circuit coupled to the BLU and the plurality of pixels, the controller circuit configured to:
determine a first settle time for a first current display frame from display data for the first current display frame and display data for a previous display frame as a largest of a plurality of effective settle times for the plurality of rows, each effective settle time corresponding to a settle time for a respective row of the plurality of rows increased by a respective amount of time between a start of transition for a first row of the plurality of rows and a start of transition for the respective row,
turn on the BLU upon expiration of the determined first settle time,
determine a second settle time for a second current display frame subsequent to the first current display frame from display data for the second current display frame and the display data for the first current display frame as a largest of the plurality of effective settle times updated for the second current display frame, and turn on the BLU upon expiration of the determined second settle time, the first settle time corresponding to a first expected amount of time for the plurality of pixels to transition from a first state corresponding to the display data for the previous display frame to a second state corresponding to the display data for the first current display frame, and the second settle time corresponding to a second expected amount of time for the plurality of pixels to transition from the second state corresponding to the display data for the first current display frame to a third state corresponding to the display data for the second current display frame.

2. The display device of claim 1, wherein each pixel of the plurality of pixels comprises a liquid crystal (LC) layer for controlling a polarization of the light provided by the BLU.

3. The display device of claim 1, further comprising:
one or more temperature sensors for sensing a temperature at one or more locations within the display device, wherein the controller circuit is configured to determine the first settle time further based on the sensed temperature.

4. The display device of claim 1, wherein the controller circuit is further configured to:
determine, for each of the pixels, a pixel settle time based on a difference between the display data corresponding to each of the pixels for the first current display frame and the display data corresponding to each of the pixels for the previous display frame.

5. The display device of claim 4, wherein the controller circuit is further configured to:
determine, for each of the rows, a settle time based on determined pixel settle times for pixels in that row.

6. The display device of claim 1, wherein the controller circuit comprises a look-up table (LUT) storing expected settle times for one or more pixels of the plurality of pixels, each of the expected settle times corresponding to at least one change in display data, and wherein the controller circuit is further configured to:
retrieve, for each of the pixels, an expected settle time from the LUT based on a difference between the display data corresponding to each of the pixels for the first current display frame and the display data corresponding to each of the pixels for the previous display frame.

7. The display device of claim 6, wherein each of the expected settle times stored in the LUT further corresponds to at least one temperature range.

8. The display device of claim 6, wherein each of the expected settle times stored in the LUT corresponds to at least one starting display data.

9. The display device of claim 1, wherein the controller circuit is further configured to signal a data source to start sending the display data for the second current display frame based on the determined first settle time.

10. A method comprising:
determining a first settle time for a first current display frame from display data for the first current display frame and display data for a previous display frame as a largest of a plurality of effective settle times for a plurality of rows comprising a plurality of pixels in a display device, each effective settle time corresponding to a settle time for a respective row of the plurality of rows increased by a respective amount of time between a start of transition for a first row of the plurality of rows and a start of transition for the respective row;

turning on a backlight unit (BLU) of the display device upon expiration of the determined first settle time;

determining a second settle time for a second current display frame subsequent to the first current display frame from display data for the second current display frame and the display data for the first current display frame as a largest of the plurality of effective settle times updated for the second current display frame; and turning on the BLU upon expiration of the determined second settle time, the first settle time corresponding to a first expected amount of time for the plurality of pixels to transition from a first state corresponding to the display data for the previous display frame to a second state corresponding to the display data for the first current display frame, and the second settle time corresponding to a second expected amount of time for the plurality of pixels to transition from the second state corresponding to the display data for the first current display frame to a third state corresponding to the display data for the second current display frame.

11. The method of claim 10, further comprising:
controlling the plurality of pixels based on the display data for the first current display frame, wherein each pixel of the plurality of pixels comprises a liquid crystal (LC) layer for controlling a polarization of light provided by the BLU.

12. The method of claim 10, further comprising:
sensing a temperature at one or more locations within the display device; and
determining the first settle time further based on the sensed temperature.

13. The method of claim 10, further comprising:
determining, for each of the pixels, a pixel settle time based on a difference between the display data corresponding to each of the pixels for the first current display frame and the display data corresponding to each of the pixels for the previous display frame.

14. The method of claim 13, further comprising:
determining, for each of the rows, a settle time based on determined pixel settle times for pixels in that row.

15. The method of claim 10, further comprising:
storing expected settle times for one or more pixels of the plurality of pixels in a look-up table (LUT), each of the expected settle times corresponding to at least one change in display data; and
retrieving, for each of the pixels, an expected settle time from the LUT based on a difference between the display data corresponding to each of the pixels for the first current display frame and the display data corresponding to each of the pixels for the previous display frame.

16. The method of claim 15, wherein each of the settle times stored in the LUT further corresponds to at least one temperature range.

17. The method of claim 15, wherein each of the settle times stored in the LUT corresponds to at least one starting display data.

18. The method of claim 10, further comprising:
signaling a data source to start sending the display data for the second current display frame based on the determined first settle time.

19. A system comprising:
an application processor configured to generate display data; and
a display device coupled to the application processor, the display device configured to receive the display data from the application processor, the display device comprising:
    a backlight unit (BLU) for providing light for displaying an image;
    a plurality of pixels organized in a plurality of rows for modulating the light provided by the BLU; and
a controller circuit coupled to the BLU and the plurality of pixels, the controller circuit configured to:
    determine a first settle time for a first current display frame from display data for the first current display frame and display data for a previous display frame as a largest of a plurality of effective settle times for the plurality of rows, each effective settle time corresponding to a settle time for a respective row of the plurality of rows increased by a respective amount of time between a start of transition for a first row of the plurality of rows and a start of transition for the respective row,
    turn on the BLU upon expiration of the determined first settle time,
    determine a second settle time for a second current display frame subsequent to the first current display frame from display data for the second current display frame and the display data for the first current display frame as a largest of the plurality of effective settle times updated for the second current display frame, and
    turn on the BLU upon expiration of the determined second settle time,
    the first settle time corresponding to a first expected amount of time for the plurality of pixels to transition from a first state corresponding to the display data for the previous display frame to a second state corresponding to the display data for the first current display frame,
    and
    the second settle time corresponding to a second expected amount of time for the plurality of pixels to transition from the second state corresponding to the display data for the first current display frame to a third state corresponding to the display data for the second current display frame.

20. The system of claim 19, wherein the controller circuit comprises a look-up table (LUT) storing expected settle times for one or more pixels of the plurality of pixels, each of the expected settle times corresponding to at least one change in display data, and wherein the controller circuit is further configured to:
    retrieve, for each of the pixels, an expected settle time from the LUT based on a difference between the display data corresponding to each of the pixels for the first current display frame and the display data corresponding to each of the pixels for the previous display frame.

* * * * *

UNITED STATES PATENT AND TRADEMARK OFFICE
CERTIFICATE OF CORRECTION

| | |
|---|---|
| PATENT NO. | : 11,580,922 B2 |
| APPLICATION NO. | : 17/134106 |
| DATED | : February 14, 2023 |
| INVENTOR(S) | : Alexander Klement |

It is certified that error appears in the above-identified patent and that said Letters Patent is hereby corrected as shown below:

On the Title Page

Item [57], Line 11, delete "plurality of pixel" and insert -- plurality of pixels --, therefor.

Signed and Sealed this
Fifth Day of September, 2023

Katherine Kelly Vidal
*Director of the United States Patent and Trademark Office*